Sept. 19, 1967     T. HUTSON, JR     3,342,885
REMOVAL OF ALUMINUM CHLORIDE FROM HYDROCARBONS
Filed Sept. 28, 1964
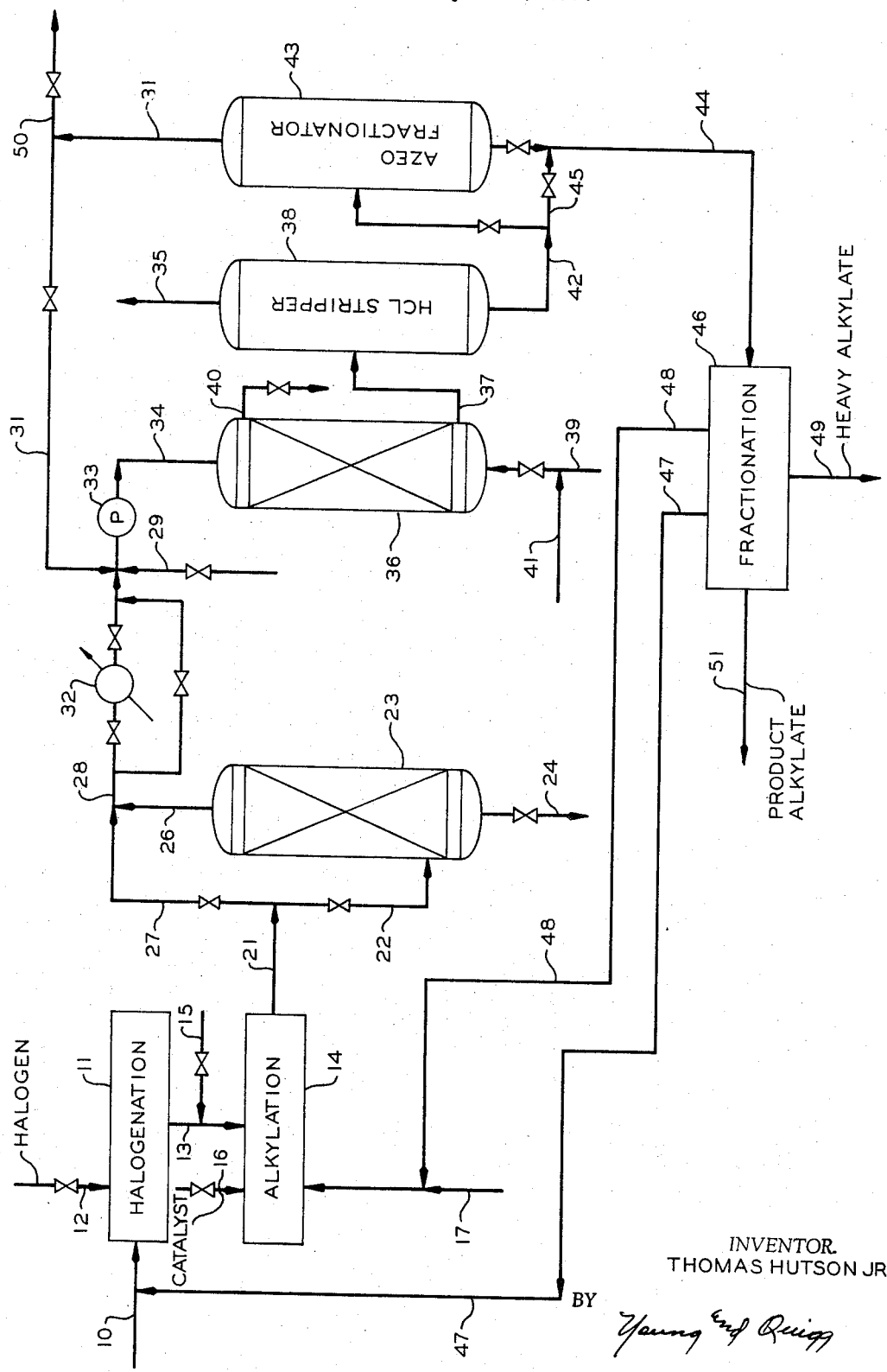
INVENTOR.
THOMAS HUTSON JR.
BY *Young and Quigg*
ATTORNEYS

United States Patent Office 3,342,885
Patented Sept. 19, 1967

3,342,885
REMOVAL OF ALUMINUM CHLORIDE FROM HYDROCARBONS
Thomas Hutson, Jr., Bartlesville, Okla., assignor to Phillips Petroleum Company, a corporation of Delaware
Filed Sept. 28, 1964, Ser. No. 399,758
10 Claims. (Cl. 260—671)

This invention relates to the removal of aluminum chloride from hydrocarbon streams. In one aspect this invention relates to a method for removing aluminum chloride catalyst from hydrocarbon stream effluents from hydrocarbon conversion zones wherein conversion of hydrocarbons is effected in the presence of aluminum chloride catalyst. In another aspect this invention relates to a combination of apparatus for removing aluminum chloride from said hydrocarbon streams.

Aluminum chloride has long been used in numerous processes for the conversion of hydrocarbons, including the decomposition or cracking of high-boiling hydrocarbons, isomerization of low-boiling hydrocarbons, polymerization of olefins, and alkylation of alkylatable hydrocarbons. The hydrocarbon effluent obtained from the reaction zone of such processes usually contains a small amount of the aluminum chloride catalyst, sometimes in an amount as small as about 0.01 weight percent. The concentration of aluminum chloride in such hydrocarbon streams will usually be within the range of from about 100 to about 1000 p.p.m. However, the invention is applicable to hydrocarbon streams containing concentrations of aluminum chloride outside this range. Although this amount of aluminum chloride in the hydrocarbon stream may be small, and the aluminum chloride may be completely soluble in the hydrocarbon, the presence thereof in the hydrocarbon stream gives rise to numerous troubles in process equipment. The presence of the aluminum chloride results in serious fouling of heat exchangers, condensers, reboilers and other parts of the equipment used in the process. In addition, corrosion is a serious problem resulting in malfunctioning of valves, pumps, control mechanisms, and the like. A major obstacle is encountered in reaction systems where a clean, representative sample of a hydrocarbon stream must be obtained for analysis in automatic analyzing equipment.

An example of a hydrocarbon stream from which the removal of aluminum chloride catalyst is particularly important is a hydrocarbon stream used in the manufacture of a detergent grade alkylate. One widely used method for the production of a large class of detergents comprises the alkylation of certain aromatic hydrocarbons with haloalkanes with an aluminum chloride catalyst to produce an alkylate comprised principally of monoalkyl aromatics which are subsequently sulfonated. Entrained and/or dissolved aluminum chloride catalyst in the alkylation zone effluent is harmful to the alkylate product in subsequent processing steps because it cannot be heated to temperatures in excess of about 300° F. in the absence of aluminum chloride catalyst without causing decomposition or degradation of said alkylate.

Methods resorted to heretofore to effect the removal of aluminum chloride from hydrocarbon streams include adsorption on surface active media such as bauxite and charcoal, water washing, and flash evaporation. Separation of entrained aluminum chloride catalyst can be achieved to a substantial degree by passage of the hydrocarbon stream through a bed of highly adsorptive material. However, such adsorbents are not very effective in removing aluminum chloride catalyst contaminants dissolved in the hydrocarbon stream. Water washing is an effective method for removing aluminum chloride from hydrocarbon streams and is simple in principle. However, where the hydrocarbon stream is to be analyzed for hydrogen chloride content, water washing cannot be used to remove the aluminum chloride since the hydrogen chloride content will be changed in the water washing process. Flash evaporation of the sample stream is an effective method for removing aluminum chloride from hydrocarbon streams provided the ratio of heavy to light hydrocarbons is constant and provided the flash temperature can be maintained low enough to minimize the carryover of aluminum chloride. The temperature and pressure of flashing are very critical so that this method of removing aluminum chloride is difficult to control.

I have discovered that aluminum chloride catalyst contained in a hydrocarbon stream effluent from a hydrocarbon conversion zone, wherein hydrocarbons are converted in the presence of aluminum chloride catalyst, can be removed from said effluent stream by contacting same with an oxygen-containing treating agent consisting of certain aliphatic alcohols, ketones, esters, and acids (defined further hereinafter). Said treating agents react with the aluminum chloride catalyst contained in said effluent to form complex aluminum chloride-containing salts or compounds which are substantially insoluble in said effluent and said treating agent. Thus, broadly speaking, the present invention resides in removing aluminum chloride contained in a hydrocarbon stream by contacting said stream with one of said treating agents whereby a precipitate forms in the resulting mixture and separating said precipitate from said mixture; and an apparatus for carrying out said removal of aluminum chloride from said stream.

An object of this invention is to provide a method for removing aluminum chloride catalyst from hydrocarbon streams containing the same. Another object of this invention is to provide a convenient, economical and highly satisfactory method for purifying a hydrocarbon stream effluent from a hydrocarbon conversion zone carried out in the presence of aluminum chloride catalyst. Another object of this invention is to provide a method for removing aluminum chloride catalyst from a hydrocarbon stream effluent obtained from a hydrocarbon conversion carried out in the presence of said catalyst without substantially altering the composition of said effluent. Another object of this invention is to provide a method for removing aluminum chloride catalyst from a hydrocarbon stream effluent from a hydrocarbon conversion process carried out in the presence of said catalyst and promoted with hydrogen chloride without substantially altering the composition of said effluent and without removing hydrogen chloride contained in said effluent. Another object of this invention is to provide a method for removing aluminum chloride from hydrocarbon streams to reduce corrosion and clogging of processing equipment employed in processing said streams. Another object of this invention is to provide a method for removing aluminum chloride catalyst from a hydrocarbon stream containing the same by contacting said stream with an excess of a treating agent and removing excess treating agent from said stream by azeotropic distillation. Still another object of this invention is to provide a method of recovering hydrogen chloride produced in hydrocarbon conversion processes carried out in the presence of aluminum chloride catalyst. Still another object of this invention is to provide an apparatus which can be employed in carrying out the above-described methods. Other aspects, objects, and advantages of the invention will be apparent to those skilled in the art in view of this disclosure.

Thus, according to the invention, there is provided a process for removing aluminum chloride from a hydrocarbon stream, which process comprises the steps of: mixing said stream with a treating agent selected from the group consisting of aliphatic alcohols, esters, acids, and ketones containing from 1 to 5 carbon atoms per molecule capable of forming with said aluminum chloride a complex salt substantially insoluble in said hydrocarbon and in said treating agent whereby a precipitate of said complex salt of aluminum chloride and said treating agent forms; and separating said precipitate from the resulting admixture.

Further according to the invention, there is provided an apparatus for removing aluminum chloride from hydrocarbon streams, said apparatus comprising means for contacting said streams with a treating agent of the invention whereby a precipitate of a complex aluminum-containing salt or compound is formed, means for separating said precipitate from the contacted hydrocarbon stream, and means for separating excess treating agent from the treated hydrocarbon stream and returning said excess treating agent to said contacting means.

The invention is particularly applicable for the removal of aluminum chloride catalyst from hydrocarbon effluent streams from hydrocarbon conversion processes comprising alkylating an aromatic hydrocarbon, e.g., benzene, with haloalkanes containing from 10 to 15 carbon atoms per molecule. In such processes the aromatic hydrocarbon is supplied to the alkylation zone in an amount which is in excess of the amount required to react with the haloalkanes present in the alkylation zone so as to insure the reaction of all of said haloalkanes. It is a feature of the present invention that the treating agents of the invention will form azeotropic mixtures with aromatic hydrocarbons. Thus, the excess aromatic hydrocarbon in said effluent streams can be utilized to remove the excess treating agent by azeotropic distillation. Even though said treating agent is preferably utilized in an excess amount, said amount is a small amount. Thus, said azeotropic distillation provides a particularly convenient method for removing said excess treating agent when it is desired to do so. However, it will be understood it is within the scope of the invention to leave any excess treating agent in the treated hydrocarbon in those instances where product purity does not require its removal.

Thus, further in accordance with the invention, there is provided an alkylation process wherein an excess of an alkylatable aromatic hydrocarbon is alkylated in an alkylation zone with an alkyl chloride in the presence of an aluminum chloride catalyst and hydrogen chloride promoter therefor and wherein the hydrocarbon effluent from said alkylation zone contains a small but appreciable amount of said catalyst, the improvement comprising: mixing said hydrocarbon effluent with a treating agent selected from the group consisting of aliphatic alcohols, esters, acids, and ketones containing from 1 to 5 carbon atoms per molecule which is capable of forming with said aluminum chloride a complex salt substantially insoluble in said effluent and in said treating agent, and which is also capable of forming an azeotrope with said aromatic hydrocarbon, whereby said complex salt is formed, said treating agent being utilized in an amount in excess of that required to react with all of said aluminum chloride; separating said salt from said treated effluent; and fractionating said treated effluent to remove therefrom an azeotropic mixture comprising a portion of said aromatic hydrocarbon and remaining excess of said treating agent.

An important advantage of the invention is that aluminum chloride can be removed from hydrocarbon streams without concomitantly removing dissolved hydrogen chloride which may be present in said streams. Hydrogen chloride is a relatively expensive chemical and the provision of same as a promoter in hydrocarbon conversion processes catalyzed by aluminum chloride catalyst is a major expense item of such processes. This advantage of the invention is particularly important in those conversion processes where hydrogen chloride is produced in the conversion zone, e.g., the alkylation of aromatics with alkyl halides, because said produced hydrogen chloride can be subsequently recovered as a product of the process.

It is well known that aluminum chloride forms a complex or complexes with hydrocarbons and said complex or complexes have catalytic properties. The chemistry of aluminum chloride catalysis of hydrocarbon conversions is not completely understood. It is presently believed by those skilled in the art that aluminum chloride per se and aluminum chloride-hydrocarbon complexes both exert catalytic activities in said conversions. Thus, herein and in the claims, unless otherwise specified, the term "aluminum chloride catalyst" is employed generically to include both aluminum chloride and aluminum chloride-hydrocarbon complexes.

The oxygen-containing treating agent which is utilized in the practice of the invention can be any suitable aliphatic alcohol, ketone, acid, or ester containing from 1 to 5 carbon atoms per molecule, which is capable of forming a complex salt or compound with said aluminum chloride which is substantially insoluble in the hydrocarbon stream being treated and in the treating agent, and which forms a minimum boiling azeotropic mixture with aromatic hydrocarbons, e.g., benzene, toluene, and xylene.

The presently preferred treating agents for use in the practice of the invention are the saturated aliphatic alcohols containing from 1 to 5, preferably 1 to 3, carbon atoms per molecule, with ethyl alcohol being the presently most preferred treating agent.

It is preferred that said treating agents be essentially anhydrous for use in the practice of the invention. However, small amounts of water up to about ten weight percent, preferably not more than about five weight percent, can be tolerated. If necessary, excess water can be removed from the system as described hereinafter.

Examples of suitable treating agents which can be used in the practice of the invention include, among others, the following: methyl alcohol, ethyl alcohol, methylethyl ketone, methyl propionate, n-propyl formate, isopropyl alcohol, t-butyl alcohol, n-propyl alcohol, allyl alcohol, sec-butyl alcohol, formic acid, isobutyl alcohol, n-butyl alcohol, acetic acid, isoamyl alcohol, propionic acid, isobutyric acid, n-butyric acid, isobutyl propionate, isoamyl acetate, and 2-butanone.

The amount of treating agent used in the practice of the invention will depend upon the amount of aluminum chloride in the hydrocarbon stream being treated. In all instances the amount of treating agent utilized will be an amount which is at least sufficient to react with all or essentially all of the aluminum chloride present in said hydrocarbon stream, i.e., an amount stoichiometrically equivalent (on a mol for mol basis) to the amount of aluminum chloride present. However, it is preferred to employ an excess of said treating agent to insure complete or essentially complete removal of the aluminum chloride. Thus, the amount of treating agent utilized in the practice of the invention will usually be an amount within the range of from 0.25 to 12, preferably 2.5 to 6 pounds of treating agent per pound of aluminum chloride present in the hydrocarbon stream being treated.

The process conditions employed in contacting the aluminum chloride-containing hydrocarbon stream with a treating agent of the invention can vary over a considerable range depending upon operating conditions in other steps of the overall process. Generally speaking, the contacting temperature will be within the range of from 50 to 200° F., preferably 75 to 150° F., so as to avoid possible melting and/or decomposition of the complex salt formed by the aluminum chloride and said treating agent. Pressure is not critical and will usually be within the range of from atmospheric to 100 p.s.i.g. When operating as shown in the attached drawing, the contacting of the hydrocarbon stream with the treating agent of the invention will usually be carried out at the temperature of said hydrocarbon stream as it leaves the coalescer tower.

Referring now to the drawing, the invention will be more fully explained. Said drawing is a schematic flow sheet of one type of hydrocarbon conversion process having incorporated therein one embodiment of the present invention. The process illustrated comprises the alkylating of an aromatic hydrocarbon with an alkyl halide to produce a detergent grade alkylate. It will be understood that said drawing is diagrammatic in nature and many valves, pumps, condensers, heaters, surge tanks, control instruments, etc., not necessary for explanation of the invention to those skilled in the art, have been omitted. In the process illustrated in said drawing, a suitable hydrocarbon mixture comprising predominantly normal paraffinic and isoparaffinic hydrocarbons of suitable boiling range, such as a $C_{10}$ to $C_{15}$ or a $C_{10}$ to $C_{13}$ fraction, is introduced via conduit 10 into photochemical halogenation zone 11 wherein it is contacted in the presence of light with a halogenating agent introduced via conduit 12. Usually the hydrocarbon fraction introduced into halogenation zone 11 will preferably contain a high percentage of normal paraffinic hydrocarbons. Such a fraction can be obtained by contacting kerosene with a suitable molecular sieve. However, it is within the scope of the invention to utilize mixtures of hydrocarbons which comprise predominantly branched chain paraffin hydrocarbons. If desired, the hydrocarbon introduced via conduit 10 can be a pure or essentially pure paraffinic hydrocarbon.

Chlorine is the presently most preferred halogenating agent. Any suitable halogenation conditions can be employed in said halogenation zone but it is preferred to select conditions which provide about 20 percent conversion of the hydrocarbons to halogenated hydrocarbons per pass. Said conditions will include a temperature within the range of from 0 to 100° F., preferably 20 to 50° F., a pressure within the range of from 20 to 100 p.s.i., preferably 30 to 50 p.s.i., and a reaction time within the range of 8 to 20 seconds. It will be understood that said conditions are interrelated and variation in one condition will be accompanied by variation in one or more of the other conditions. For example, when using the preferred halogenating agent (chlorine), pressure is employed to maintain the hydrocarbon in liquid phase (if necessary) and also to increase the solubility of gaseous chlorine in said hydrocarbons. The amount of pressure actually employed will depend upon the hydrocarbons present, the temperature, and the desired conversion level. With respect to temperature, higher temperatures favor the formation of dichlorides which is undesirable. Higher conversion rates also favor the formation of dichlorides. It is preferred to select conditions such that the ratio of monochlorides to dichlorides is within the range of from 4:1 to 30:1, preferably 7:1 to 12:1, more preferably about 9:1. The chlorination reaction is a photochemical reaction and is carried out by dissolving the chlorine in the hydrocarbon and then exposing the resulting mixture or solution to ultraviolet light under time, temperature, and pressure conditions within the ranges set forth above.

It is to be understood that the invention is not limited to employing photochemical halogenation in the halogenation step. Haloalkanes prepared by any other suitable halogenation method such as thermal and catalytic methods can be employed in the practice of the invention. Halogenating agents in addition to those mentioned above which can be employed include sulfuryl chloride, thionyl chloride, and others. Halogenation catalysts which can be employed include ferric chloride, antimony chloride, sulfur chloride, iodoform, benzoyl peroxide and others. It should also be understood that it is within the scope of the invention to introduce pure or substantially pure halohydrocarbons from any source into the system via conduit 15, instead of or in addition to the halohydrocarbons from conduit 13.

A mixture of halogenated and nonhalogenated hydrocarbons is withdrawn from halogenation zone 11 via conduit 13 and introduced into alkylation zone 14. A suitable alkylation catalyst, such as aluminum chloride and/or aluminum chloride-hydrocarbon complex is introduced into alkylation zone 14 via conduit 16. A suitable alkylatable hydrocarbon is introduced into zone 14 via conduit 17. The process is applicable to the alkylation of benzene, toluene, xylene, and the like and is particularly applicable to the alkylation of benzene (the preferred aromatic hydrocarbon) with the halogenated n-paraffinic and isoparaffinic hydrocarbons containing from 10 to 15 carbon atoms. In some instances high aromatic content naphtha fractions boiling within the range of from about 175 to about 300° F., such as can be obtained from thermally cracked naphthas, can be employed as a source of alkylatable aromatic hydrocarbon. A particularly desirable catalyst is the complex of hydrocarbon with aluminum chloride. In addition to the catalyst it is desirable that the corresponding hydrogen halide be present in the reaction zone since this material maintains catalyst activity at a high level. The reaction rate and the conversion of the hydrocarbon feed is dependent on the amount of aluminum chloride in the aluminum chloride-hydrocarbon complex. However, the quantity of aluminum chloride in the complex can be varied over wide ranges to provide a corresponding range of feed reactant conversion. While the overall activity of the catalyst is established by the aluminum chloride content, as stated, the presence of hydrogen chloride is required to provide a high activity. Usually the quantity of hydrogen chloride present is between about 0.5 and about 6 weight percent of the feed with about 2 to 4 weight percent being preferred. It is usually not necessary to add additional hydrogen chloride because the hydrocarbon charge will contain HCl liberated in the previous chlorination step. Also, HCl is liberated in the alkylation reaction.

The aluminum chloride-hydrocarbon complex catalyst can be originally prepared by mixing aluminum chloride and kerosene in a weight ratio of about 8:5. During operation of the process, the original complex catalyst is replaced with complex catalyst formed in the process. During operation of the process the heat of hydrolysis of the catalyst phase is usually in the range of 140 to 160 calories per gram. However, catalysts having higher heats of hydrolysis in the order of 300 to 325 calories per gram, e.g., new catalysts, can also be employed in the practice of the invention. It is also within the scope of the invention to employ catalysts having heats of hydrolysis less than 140 calories per gram, e.g., 100 to 139 calories per gram, as explained hereinafter. Thus, the overall range of catalysts which can be employed in the practice of the invention are those having a heat of hydrolysis within the range of from 100 to 325 calories per gram.

The conditions employed in alkylation zone 14 will depend upon the catalyst employed, the aromatic hydrocarbon to be alkylated, and the boiling points of the haloalkanes. As will be understood by those skilled in the art, said conditions are interrelated. When employing the above-described aluminum chloride catalysts, the alkylation will generally be carried out at a temperature within the range of from 50 to 110° F. with a pressure sufficient to maintain liquid phase conditions and to prevent vaporization of catalyst. When operating in a continuous system, flow rates of reactants should be maintained such that the residence or contact time in the contactor or reaction zone is within the range of from about 10 minutes to about 30 minutes, preferably from about 10 to about 20 minutes.

The ratio of the total reactants feed to the reactor or alkylation zone, i.e., the sum of the aromatic hydrocarbon plus the mixture of haloalkanes, to the aluminum chloride catalyst will usually be within the range of from about 1:5 to 2:1, preferably about 1:1, on a volume basis. The mol ratio of the aromatic hydrocarbon to the haloalkanes entering the alkylation zone should be such as to furnish at least one mol of aromatic hydrocarbon, e.g., benzene, per gram atom of halogen on the haloalkanes. It is preferred to operate with an excess of aromatic hydrocarbon. Thus, the mol ratio of the aromatic hydrocarbon to the haloalkanes can vary over a wide range but will generally be maintained within the range of from about 2:1 to 30:1, preferably from 8:1 to 15:1.

It will be understood that alkylation zone 14 includes, in addition to a suitable contactor or reactor for carrying out the alkylation reaction, a separation vessel or zone wherein a hydrocarbon phase is separated from the catalyst phase which is returned to said contactor or reactor. Said hydrocarbon phase is withdrawn from zone 14 via conduit 21 and passed via conduit 22 into the lower portion of coalescer 23 for removal of entrained alumnium chloride catalyst. Said coalescer 23 can comprise any suitable type of vessel and conveniently comprises an upright tower containing a bed of any suitable contacting material such as porcelain saddles, Raschig rings, gravel, anthracite coal, etc. Coalesced and separated catalyst is withdrawn from the bottom of vessel 23 via conduit 24. Hydrocarbon phase, now substantially free of entrained catalyst but still containing dissolved aluminum chloride catalyst is withdrawn from said coalescer via conduit 26. In some instances where the amount of entrained catalyst in the hydrocarbon stream in conduit 21 is negligibly small, said hydrocarbon stream can be passed around said coalescer via conduit 27 and introduced into conduit 28.

The hydrocarbon stream in conduit 28 is then mixed with a stream of a treating agent of the invention, for example essentially anhydrous ethyl alcohol, introduced via conduit 29. Ethyl alcohol and benzene form a minimum boiling azeotrope boiling at 154.7° F. and containing 32.4 weight percent benzene. A stream of ethyl alcohol-benzene azeotrope is also introduced via conduit 31 from a source described hereinafter. If desired or necessary, heat exchanger 32 can be employed, in combination with the by-pass arrangement shown, to control the temperature of the stream in conduit 28. The resulting mixture is then passed through mixing pump 33 and introduced via conduit 34 into filter tower 36 for removal of the precipitate of aluminum-containing complex salt or compound which forms upon mixing of said hydrocarbon stream and said treating agent. Said filter tower contains a bed of any suitable filter medium such as sand or any other inert medium. While only one filter tower is shown in the drawing, it will be understood that two or more of said towers, conventionally manifolded together, can be employed in conventional on-off operation so that one tower can be regenerated while another tower is in service. When the pressure drop across a filter in service reaches the desired or permissible operating maximum, e.g., 60 to 100 p.s.i., or said filter becomes ineffective for removal of precipitate, the filter in service is removed therefrom and the stream in conduit 34 switched into another filter. Said filter which has been removed from service is then regenerated by backwashing with water introduced from conduit 39. Water containing the removed precipitate is withdrawn from the filter via conduit 40. Upon completion of the backwashing of the spent filter it is preferably dried by means of a stream of gas such as air or combustion gases which can be introduced from a suitable source via conduit 41.

Filtrate, free of said precipitate, is withdrawn from filter 36 via conduit 37 and introduced into hydrogen chloride stripper tower 38. Said stripper tower will be operated under any suitable conditions for removing a stream of hydrogen chloride gas overhead therefrom via conduit 35. Usually, said conditions will comprise a top tower temperature within the range of from 50 to 75° F., a bottom tower temperature of about 190 to 225° F., and a pressure within the range of from substantially atmospheric to about 5 p.s.i.g. Said hydrogen chloride gas in conduit 35 can be passed to compression for recovery as a product of the process. If desired or necessary, said hydrogen chloride can be dried by any suitable means prior to or after compression.

Bottoms from hydrogen chloride stripper tower 38 are withdrawn via conduit 42 and introduced into fractionator 43. Said fractionator 43 comprises a conventional azeotropic distillation tower and there is removed overhead therefrom via conduit 31 a stream comprised essentially of ethyl alcohol-benzene azeotrope. Said fractionating tower 43 will be operated under suitable conditions such as to remove said azeotropic mixture therefrom. Operating conditions in said tower will depend upon the boiling point of the azeotropic mixture being removed overhead therefrom. When the treating agent is ethyl alcohol and the aromatic hydrocarbon is benzene, as described above, said tower will usually be operated with a top tower temperature within the range of from about 155 to about 170° F. and a pressure within the range of about 1 to 5 p.s.i.g.

In some instances, as when the specifications on the product hydrocarbons stream will permit, it is not necessary to remove any excess treating agent from the treated hydrocarbon stream. In such instances azeo tower 43 can be by-passed and the stream in conduit 42 passed directly into conduit 44. This method of operation is frequently feasible because of the very small amounts of treating agent used in the practice of the invention.

As mentioned above, it is preferred that the treating agents used in the practice of the invention be essentially anhydrous but that small amounts of water can be tolerated. Water present in the treating cycle of the invention, such as may be introduced with the treating agent or may otherwise accumulate in said cycle, can be removed overhead from azeotropic fractionator 43 via conduit 31 as either an azeotrope of water and benzene and/or the treating agent. As shown in the example given hereinafter, the overhead stream in conduit 31 is a small stream compared to the stream being treated. It is therefore feasible to remove water from the system by bleeding a portion or all of the stream in conduit 31 from the system via conduit 50. Also, a portion or all of said stream removed via conduit 50 can be dried in any suitable manner, as by contacting with a suitable adsorbent (e.g., bauxite) which will remove water, and then returned to the system. Benzene, ethyl alcohol, and water form a ternary azeotrope boiling at 64.86° C. at 760 mm. Hg and containing 53.9, 22.8, and 23.3 mol percent of said components, respectively. If desired, anhydrous ethyl alcohol can be recovered from this ternary mixture for return to the system, by a series of distillation steps similar to those illustrated in Figure 81 on page 52 of Perry, "Chemical Engineers Handbook," 3rd Edition, McGraw-Hill Book Co., New York (1950).

A hydrocarbon stream, now essentially free of hydrogen chloride and ethyl alcohol, is withdrawn from the bottom of fractionator 43 via conduit 44 and introduced into fractionation zone 46. Said fractionation zone 46 can comprise any suitable number of conventional fractionators for making the indicated desired separations. An overhead fraction comprising nonhalogenated hydrocarbons is withdrawn from said fractionation zone via conduit 47 and recycled to conduit 10 for introduction into halogenation zone 11. Another overhead fraction comprising benzene is withdrawn from said fractionation zone 46 via conduit 48 for recycle to conduit 17 and introduction into alkylation zone 14. A bottoms or heavy alkylate stream is withdrawn from said fractionation zone via conduit 49 and comprises a high molecular weight, high density material which can be utilized as a high density fuel stock. A purified product alkylate stream is withdrawn from said fractionation zone 46 via conduit 51 and passed to storage, as a product of the process, for subsequent use in the manufacture of detergents or other use.

The following example will serve to further illustrate the invention.

EXAMPLE

Referring to the drawing, a mixture of $C_{10}$ to $C_{13}$ paraffinic hydrocarbons is chlorinated in halogenation zone 11 in conventional manner in accordance with the above description of the operation of said halogenation zone. The haloalkanes product is passed through conduit 13 to alkylation zone 14. In said alkylation zone said haloalkanes are used to alkylate benzene in conventional manner, as described above, employing aluminum chloride catalyst and hydrogen chloride promoter therefor. The hydrocarbon phase effluent from alkylation zone 14 is passed through coalescing zone 23 for removal of entrained aluminum chloride catalyst. Effluent from said coalescer is passed through conduit 26, mixed in conduit 28 and pump 33 with essentially anhydrous ethyl alcohol from conduit 29 and ethyl alcohol-benzene azeotrope from conduit 31. The resulting mixture is then passed through filter 36 wherein the precipitate formed upon mixing said ethyl alcohol with said hydrocarbon stream is filtered. Hydrocarbon phase from said filter is passed via conduit 37 into hydrogen chloride stripper 38. Hydrogen chloride is removed overhead from said stripper and the HCl-free hydrocarbon is passed via conduit 42 into fractionator 43. Ethyl alcohol-benzene azeotrope is removed overhead from said fractionator via conduit 31 and mixed with the hydrocarbon stream in conduit 28 as described. Treated hydrocarbon phase, now essentially free of aluminum chloride (less than 5 parts per million by weight), is withdrawn from fractionator 43 via conduit 44 and passed to fractionation zone 46 for fractionation as there shown and the recovery of a detergent grade alkylate via conduit 51. A stream comprising benzene is removed from fractionation zone 46 via conduit 48 and recycled to said alkylation zone 14. A stream comprising nonhalogenated paraffinic hydrocarbons is withdrawn from said fractionation zone 47 and recycled to said halogenation zone 11.

Stream compositions and flow rates for the above-described operation are set forth in Table I below.

While the invention has been described above with particular reference to a conversion process wherein aluminum chloride is employed as the catalyst in the alkylation of benzene with alkyl halides, the invention is not so limited. The invention is applicable to removing aluminum chloride from hydrocarbon streams in any conversion process wherein aluminum chloride is employed as the catalyst and the hydrocarbon streams from said conversion contain aluminum chloride. The invention is also applicable to removing aluminum chloride from hydrocarbon streams other than hydrocarbon streams from hydrocarbon conversion processes. Thus, the invention is applicable to the removal of aluminum chloride from hydrocarbon streams containing the same from any source, regardless of whether or not the aluminum chloride has been employed as a catalyst. It is within the scope of the invention to remove excess treating agent from the treated hydrocarbon stream by methods other than azeotropic distillation, e.g., ordinary distillation, adsorption, etc.

Also, while the invention has been described with particular reference to employing a mixing pump for mixing the treating agent and the hydrocarbon stream to be treated and then filtering the resulting mixture, it is within the scope of the invention to employ other contacting methods and separation means. For example, an ordinary mixing tank and settling tank can be employed, either in batchwise or continuous operation. If batchwise operation is employed, the hydrocarbon stream to be treated and the treating agent are mixed in a suitable mixing vessel, the formed precipitate allowed to settle, and the essentially aluminum chloride-free hydrocarbon stream decanted therefrom. In a continuous operation, said streams can be mixed in a first mixing vessel and then passed through a suitable series of subsequent settling vessels for separation of the formed precipitate. Still another method and means of contacting which can be employed comprises a mixing pump for mixing said hydrocarbon stream and passing the mixture to a suitable centrifuge or cyclone separator for separation of the formed precipitate therefrom. Thus, it is within the scope of the invention to employ any suitable contacting and precipitate separating methods and means.

Any suitable material can be employed for fabricating the various items of apparatus illustrated in the drawing and other apparatus which may be employed in carrying out the invention. In several instances it will be necessary that said apparatus be fabricated from acid-resistant materials. Many materials such as acid-resistant alloys, such as Hastelloy, etc., glass-lined vessels, and others, are available for acid service and those skilled in the art will have no difficulties in determining where such materials should be employed in view of this disclosure.

While certain embodiments of the invention have been described for illustrative purposes, the invention obviously is not limited thereto. Various other modifications will be apparent to those skilled in the art in view of this disclosure. Such modifications are within the spirit and scope of the invention.

TABLE I

| | Coalescer Effluent | Ethyl Alcohol | Ethyl Alcohol-Benzene Azeotrope | Feed to Filter | Filter Wash | Filter Effluent | HCl Tower O.H.[1] | Azeo Tower Feed | Azeo Tower Bottoms | Fractionation Zone 46 | | | |
|---|---|---|---|---|---|---|---|---|---|---|---|---|---|
| Stream No | 28 | 29 | 31 | 34 | 40 | 37 | 35 | 42 | 44 | 47 | 48 | 49 | 51 |
| Composition, lbs./hr.: | | | | | | | | | | | | | |
| Hydrogen chloride | 49 | | | 49 | | 49 | 49 | | | | | | |
| Benzene | 1,362 | | 9.1 | 1,371.1 | | 1,371.1 | | 1,371.1 | 1,362 | | 1,362 | | |
| Normal paraffins[2] | 825 | | | 825 | | 825 | | 825 | 825 | 825 | | | |
| Alkyl benzenes | 244 | | | 244 | | 244 | | 244 | 244 | | | | 244 |
| Heavy alkylate | 18.8 | | | 18.8 | | 18.8 | | 18.8 | 18.8 | | | 18.8 | |
| Ethyl alcohol | | 0.4 | 4.4 | 4.8 | 0.4 | 4.4 | | 4.4 | 4.4 | | | | |
| Aluminum chloride | 1.3 | | | 1.3 | 1.3 | (³) | | | | | | | |
| Total, lbs./hr | 2,500.1 | 0.4 | 13.5 | 2,514.0 | 1.7 | 2,512.3 | 49 | 2,463.3 | 2,449.8 | 825 | 1,362 | 18.8 | 244 |

[1] Overhead.
[2] n-Decane, n-undecane, n-dodecane, n-tridecane.
[3] Essentially zero, i.e., less than 5 p.p.m.

I claim:
1. A process for removing aluminum chloride from a hydrocarbon stream, which process comprises the steps of: mixing said stream with a treating agent selected from the group consisting of aliphatic alcohols, esters, acids, and ketones containing from 1 to 5 carbon atoms per molecule capable of forming with said aluminum chloride a complex salt substantially insoluble in said hydrocarbon and in said treating agent whereby a precipitate of said complex salt of aluminum chloride and said treating agent forms; and separating said precipitate from the resulting admixture.

2. A process for removing aluminum chloride catalyst from a hydrocarbon reaction effluent stream, which process comprises: mixing said effluent stream in a mixing zone with a treating agent selected from the group consisting of aliphatic alcohols, esters, acids, and ketones containing from 1 to 5 carbon atoms per molecule capable of forming with said aluminum chloride a complex salt substantially insoluble in said hydrocarbon and in said treating agent whereby a precipitate of said complex salt of aluminum chloride and said treating agent forms, said treating agent being utilized in an amount at least sufficient to react with essentially all of said aluminum chloride in said effluent stream; separating said precipitate from the resulting admixture; and recovering a treated, essentially aluminum chloride-free, effluent stream.

3. A process for removing aluminum chloride catalyst from the hydrocarbon effluent stream from a hydrocarbon conversion zone, which process comprises: mixing said hydrocarbon effluent stream with a treating agent selected from the group consisting of aliphatic alcohols, esters, acids, and ketones containing from 1 to 5 carbon atoms per molecule capable of forming with said aluminum chloride a complex salt substantially insoluble in said hydrocarbon and in said treating agent whereby a precipitate of said complex salt of aluminum chloride and said treating agent forms, said treating agent being utilized in an amount within the range of from 0.25 to 12 pounds per pound of aluminum chloride contained in said hydrocarbon effluent stream, and said mixing being carried out at a temperature within the range of from 50 to 200° F.; passing the resulting admixture to a separation zone and therein separating said precipitate from said admixture; and recovering an essentially aluminum chloride-free hydrocarbon effluent stream from said separation zone.

4. A process for removing aluminum chloride catalyst from the hydrocarbon effluent stream from a hydrocarbon conversion zone, which process comprises: mixing said hydrocarbon effluent stream with methyl alcohol whereby a precipitate of a complex salt of aluminum chloride and said alcohol forms, said alcohol being utilized in an amount within the range of from 0.25 to 12 pounds per pound of aluminum chloride contained in said hydrocarbon effluent stream, and said mixing being carried out at a temperature within the range of from 50 to 200° F.; passing the resulting admixture to a separation zone and therein separating said precipitate from said admixture; and recovering an essentially aluminum chloride-free hydrocarbon effluent stream from said separation zone.

5. A process for removing aluminum chloride catalyst from the hydrocarbon effluent stream from a hydrocarbon conversion zone, which process comprises: mixing said hydrocarbon effluent stream with ethyl alcohol whereby a precipitate of a complex salt of aluminum chloride and said alcohol forms, said alcohol being utilized in an amount within the range of from 0.25 to 12 pounds per pound of aluminum chloride contained in said hydrocarbon effluent stream, and said mixing being carried out at a temperature within the range of from 50 to 200° F.; passing the resulting admixture to a separation zone and therein separating said precipitate from said admixture; and recovering an essentially aluminum chloride-free hydrocarbon effluent stream from said separation zone.

6. A process for removing aluminum chloride catalyst from the hydrocarbon effluent stream from a hydrocarbon conversion zone, which process comprises: mixing said hydrocarbon effluent stream with isopropyl alcohol whereby a precipitate of a complex salt of aluminum chloride and said alcohol forms, said alcohol being utilized in an amount within the range of from 0.25 to 12 pounds per pound of aluminum chloride contained in said hydrocarbon effluent stream, and said mixing being carried out at a temperature within the range of from 50 to 200° F.; passing the resulting admixture to a separation zone and therein separating said precipitate from said admixture; and recovering an essentially aluminum chloride-free hydrocarbon effluent stream from said separation zone.

7. In an alkylation process wherein an excess of an alkylatable aromatic hydrocarbon is alkylated in an alkylation zone with an alkyl chloride in the presence of an aluminum chloride catalyst and hydrogen chloride promoter therefor and wherein the hydrocarbon effluent from said alkylation zone contains a small but appreciable amount of said catalyst, the improvement comprising: mixing said hydrocarbon effluent with a treating agent selected from the group consisting of aliphatic alcohols, esters, acids, and ketones containing from 1 to 5 carbon atoms per molecule which is capable of forming with said aluminum chloride a complex salt substantially insoluble in said effluent and in said treating agent, and which is also capable of forming an azeotrope with said aromatic hydrocarbon, whereby said complex salt is formed, said treating agent being utilized in an amount in excess of that required to react with all of said aluminum chloride; separating said salt from said treated effluent; and fractionating said treated effluent to remove therefrom an azeotropic mixture comprising a portion of said aromatic hydrocarbon and remaining excess of said treating agent.

8. In an alkylation process wherein an excess of benzene as alkylated in an alkylation zone with an alkyl chloride selected from the group of alkyl chlorides containing from 10 to 15 carbon atoms per molecule, in the presence of of an aluminum chloride catalyst and hydrogen chloride promoter therefor, and wherein the hydrocarbon effluent from said alkylation zone contains a small but appreciable amount of said catalyst, the improvement comprising: mixing said hydrocarbon effluent with methyl alcohol in a mixing zone whereby a precipitate of a complex salt of aluminum chloride and said alcohol forms, said alcohol being utilized in an excess amount within the range of from 0.25 to 12 pounds per pound of aluminum chloride contained in said hydrocarbon effluent, and said mixing being carried out at a temperature within the range of from 50 to 200° F.; separating said precipitate from said treated effluent; fractionating said precipitate-free treated effluent to remove therefrom an azeotropic mixture comprising a portion of said benzene and remaining excess of said alcohol; and returning said azeotropic mixture to said mixing zone to supply at least a portion of said alcohol utilized therein.

9. In an alkylation process wherein an excess of benzene is alkylated in an alkylation zone with an alkyl chloride selected from the group of alkyl chlorides containing from 10 to 15 carbon atoms per molecule, in the presence of an aluminum chloride catalyst and hydrogen chloride promoter therefor, and wherein the hydrocarbon effluent from said alkylation zone contains a small but appreciable amount of said catalyst, the improvement comprising: mixing said hydrocarbon effluent with ethyl alcohol in a mixing zone whereby a precipitate of a complex salt of aluminum chloride and said alcohol forms, said alcohol being utilized in an excess amount within the range of from 0.25 to 12 pounds per pound of aluminum chloride contained in said hydrocarbon effluent, and said mixing being carried out at a temperature within the range of from 50 to 200° F.; separating said precipitate from said treated effluent; fractionating said precipitate-free treated effluent to remove therefrom an azeotropic mixture comprising a portion of said benzene and remaining excess of said alcohol; and returning said azeotropic mixture to said mixing zone to supply at least a portion of said alcohol utilized therein.

10. In an alkylation process wherein an excess of benzene is alkylated in an alkylation zone with an alkyl chloride selected from the group of alkyl chlorides containing from 10 to 15 carbon atoms per molecule, in the presence of an aluminum chloride catalyst and hydrogen chloride promoter therefor, and wherein the hydrocarbon effluent from said alkylation zone contains a small but appreciable amount of said catalyst, the improvement comprising: mixing said hydrocarbon effluent with isopropyl alcohol in a mixing zone whereby a precipitate of a complex salt of aluminum chloride and said alcohol forms, said alcohol being utilized in an excess amount within the range of from 0.25 to 12 pounds per pound of aluminum chloride contained in said hydrocarbon effluent, and said mixing being carried out at a temperature within the range of from 50 to 200° F.; separating said precipitate from said treated effluent; fractionating said precipitate-free treated effluent to remove therefrom an azeotropic mixture comprising a portion of said benzene and remaining excess of said alcohol; and returning said azeotropic mixture to said mixing zone to supply at least a portion of said alcohol utilized therein.

References Cited

UNITED STATES PATENTS

| | | | |
|---|---|---|---|
| 1,202,081 | 10/1916 | McAffee | 23—96 |
| 2,875,257 | 2/1959 | Thompson | 260—671 X |

DELBERT E. GANTZ, *Primary Examiner.*

C. R. DAVIS, *Assistant Examiner.*